United States Patent

[11] 3,590,265

| [72] | Inventor | William D. Richardson |
| --- | --- | --- |
| | | 234 Rounsville St., Waupun, Wis. 53963 |
| [21] | Appl. No. | 788,786 |
| [22] | Filed | Jan. 3, 1969 |
| [45] | Patented | June 29, 1971 |

[54] INSTRUCTIONAL STIMULATION DEVICE FOR THE TEACHING OF THE BEHIND-THE-WHEEL PHASE OF DRIVER EDUCATION
5 Claims, 4 Drawing Figs.

| [52] | U.S. Cl. | 307/10, 35/11 |
| --- | --- | --- |
| [51] | Int. Cl. | H02g 3/00 |
| [50] | Field of Search | 35/11; 200/16; 307/10, 9 |

[56] References Cited
UNITED STATES PATENTS

| 2,268,550 | 1/1942 | Little et al. | 200/16 X |
| 3,202,829 | 8/1965 | Kawahara | 307/10 |

Primary Examiner—David Smith, Jr.
Attorney—Berman, Davidson and Berman

ABSTRACT: A device for instructing drivers by simulating certain conditions comprising a plurality of switches and light means and a control box for actuating the switches to call attention to changed or simulated conditions and the light means to measure the time lapse between mirror checks by a driver learning how to drive.

PATENTED JUN 29 1971  3,590,265
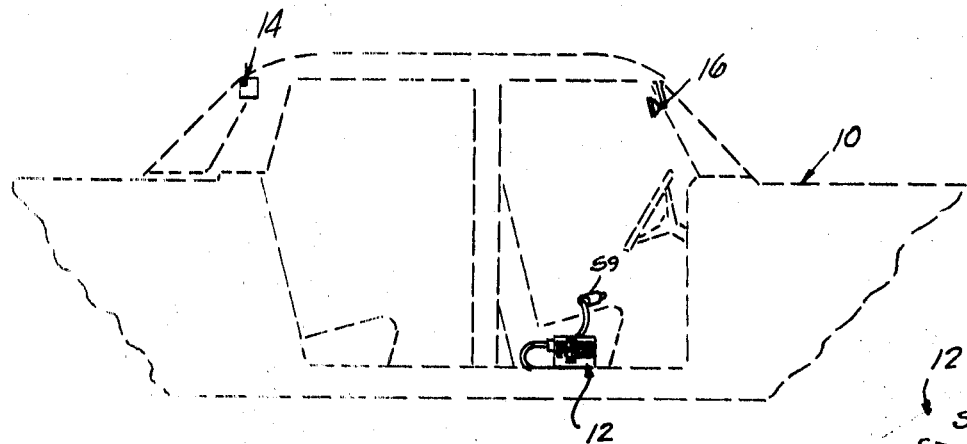
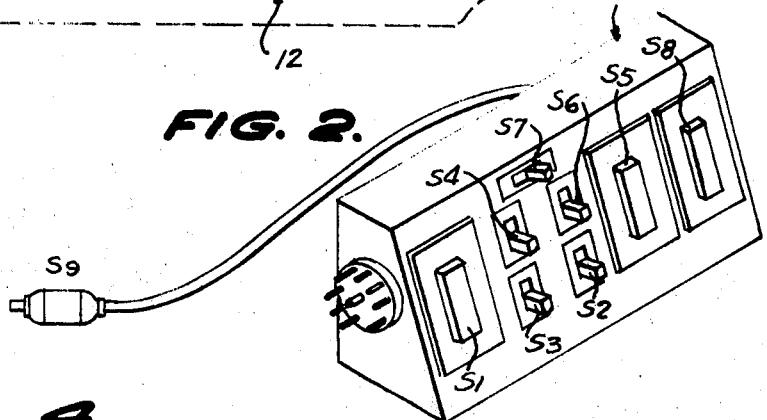
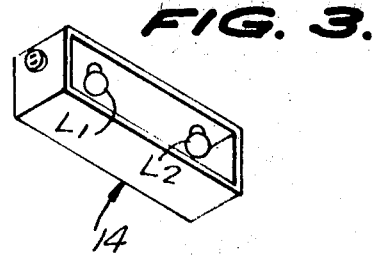
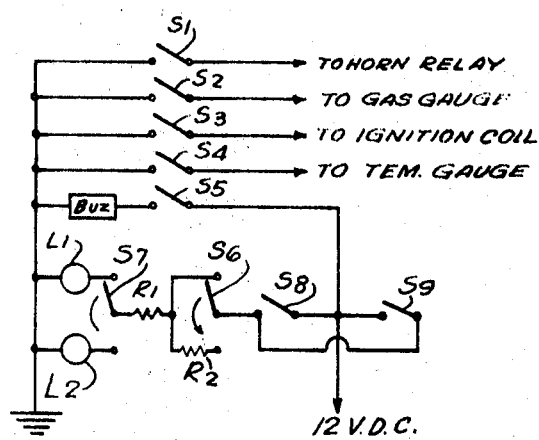
INVENTOR.
WILLIAM D. RICHARDSON,
BY
Berman, Davidson & Berman.
ATTORNEYS.

INSTRUCTIONAL STIMULATION DEVICE FOR THE TEACHING OF THE BEHIND-THE-WHEEL PHASE OF DRIVER EDUCATION

The present invention relates to a method and a device for simulating conditions in the operation of a vehicle to serve as a training aid and evaluation toll in the teaching of the behind-the-wheel phase of driver education.

It is an object of the present invention to provide a switchbox device which allows the instructor to control certain selected functions of the automobile for the purpose of instruction and evaluation.

It is yet another object of the present invention to provide a control box device which allows the instructor to select certain functions or conditions of operation of the vehicle, including a simulated gas gauge condition, a simulated ignition condition, a simulated horn condition, a simulated temperature and/or oil pressure gauge condition and a light and alarm apparatus used to condition the response to the vehicle operator for checking the rearview mirror while driving.

Various other objects and advantages of the present invention will be readily apparent from the following detailed description when considered in connection with the accompanying drawing forming a part thereof, and in which:

FIG. 1 illustrates a vehicle with which the present device is used;

FIG. 2 is an enlarged perspective view of the switchbox device embodied in the present invention;

FIG. 3 is a perspective view of the light device used to condition the response for checking the rearview mirror; and FIG. 4 is a diagrammatic view of the switch arrangement utilized in simulating certain functions and conditions of the present invention.

Referring to the drawings, the reference numeral 10 generally designates a vehicle with a front seat and a rear seat and a switch control box 12 and rear mirror lights 14.

Referring to FIGS. 2 and 4, the control box is provided with a horn relay switch S1. This switch controls the horn and grounding the horn relay through the pushbutton switch S1 located on the control box will allow the instructor to sound the horn at his discretion. It is desired to condition a student to a desirable response by sounding the horn when certain undesirable responses occur.

The wire leading from the gas tank sounding mechanism is grounded through a switch in the control box generally designated S2, and when this switch is closed the gas gauge will be switched to empty, so as to get the response of the student being instructed.

The switch control box is further provided with a switch designated S3 grounding the distributor side of the ignition coil as as to allow the instructor to shut off the engine at any time This control can serve as an additional stimulus for checking the gas gauge. It can also serve to initiate certain contrived emergency situations such as starting a stalled or flooded engine.

The control switch box is provided with a switch designated S4 which can be used to train students to check the temperature and/or the oil pressure gauges more carefully. The instructor can control the switch S4 to measure the response to the student to the temperature or oil pressure gauge.

The control box device is provided with a pushbutton switch designated S5 which sounds a buzzer. The instructor can close the switch S5 to sound the buzzer if a student fails to respond to a specific condition after a predetermined period of time.

The control box device is further provided with switches designated S6, S7, S8, and S9, which are utilized to control or actuate two lights designated L1 and L2, which are disposed adjacent the rear window so that the lights can be seen through the rearview mirror 16. The pushbutton switch S9 is used like a hospital bed signal device to actuate the lights L1 or L2 over the rear window. The switch S9 may be utilized as a remote control switch and will give the instructor more flexibility in utilizing the device. The switch S8 or the switch S6 may be utilized to actuate the rear lights L1 and L2 from the control switch device 12. The switch S6 may be thrown one way or another way to decrease the resistance of the one or increase the resistance of the other to control the current in the circuit and cause the lamps L1 or L2 to burn at lesser brilliancy. On dark, cloudy days it is necessary to reduce the brightness to keep the bulbs from reflecting in the mirror. The switch S7 is utilized to light either the lamp L1 and/or the lamp L2. It is possible to turn on either one or the other of the colored lamps with the pushbutton and to allow for 2° of brilliance with the single-pole, double-throw switch. Student drivers are asked to check the rearview mirror frequently and to respond as quickly as possible when one of the lights is lighted by indicating the color of the light. If a driver student fails to respond when the light is on, the instructor may sound the buzzer through the switch S5 after a specific period of time. Thus, when the mirror is checked within the prescribed time period or the buzzer is actuated when the mirror is not checked, it is possible to decrease effectively the time lapses between the mirror checks by the student driver. Through use of the light and alarm system during training periods, the instructor may develop the mirror check habit by a forced response technique and later evaluate whether or not the mirror has been checked at certain locations or within prescribed time periods.

Thus, from the foregoing description, it is apparent that the present invention provides a novel and simple and economical method of control box device for instructional stimulation of the driver student for teaching of the behind-the-wheel phase of driver education.

From the foregoing description, it will be apparent that various changes may be made in the form, location and relative arrangement of several parts without departing from the essential characteristics of the invention, and it is to be understood that this invention is not to be limited except by the scope of the appended claims:

What I claim is:

1. In a motor vehicle having a driver's seat, a rear window and a rearview mirror above the driver's seat, and facing the rear window, an instructional stimulation device for the teaching of the behind-the-wheel phase of driver education, comprising a control switch box with a plurality of switches connected in circuit with various electrical parts of the vehicle to test the response of a student driver to simulated conditions, including at least two lights of different colors mounted adjacent said rear window, a source of current, one of said switches comprising a two-position selector switch, and circuit means connecting said source of current to one of said lights through the two-position switch in one of its positions and to the other light in the other of its positions, whereby said lights may be selectively energized.

2. The instructional stimulation device of claim 1, and dimming resistance means, and circuit means including one of said switches to at times connect said dimming resistance means in series with the selected light.

3. The instructional stimulation device of claim 1, and wherein said circuit means includes a remote switch with an elongated two-conductor cable connected thereto.

4. The device of claim 1 wherein said plurality of switches includes separate switches adapted to be connected to the ignition coil, the temperature and pressure indicator, and to the gas indicator.

5. The device of claim 1 wherein said plurality of switches includes a separate switch adapted to be connected to the horn relay of a vehicle and a separate switch adapted to be connected to a buzzer.